US008379810B2

(12) United States Patent
Chang (10) Patent No.: US 8,379,810 B2
(45) Date of Patent: Feb. 19, 2013

(54) INTEGRATED NETWORK COMMUNICATION DEVICE

(75) Inventor: Chia-Che Chang, Xindian (TW)

(73) Assignee: Avalue Technology Inc. (TW)

( * ) Notice: Subject to any disclaimer, the term of this patent is extended or adjusted under 35 U.S.C. 154(b) by 484 days.

(21) Appl. No.: 12/761,173

(22) Filed: Apr. 15, 2010

(65) Prior Publication Data

US 2011/0255674 A1  Oct. 20, 2011

(51) Int. Cl.
*H04M 1/64* (2006.01)
(52) U.S. Cl. ............... 379/88.23; 379/216.01; 379/910; 455/401; 455/564
(58) Field of Classification Search ............... 379/93.17, 379/31, 40, 51, 88.03, 88.13, 88.22, 88.23, 379/100.06, 200, 216.01, 359, 456, 910; 705/3; 455/401, 564
See application file for complete search history.

(56) References Cited

U.S. PATENT DOCUMENTS

| 7,492,876 B2 * | 2/2009 | Fujimoto ................. 379/102.01 |
| 2005/0192845 A1 * | 9/2005 | Brinsfield et al. ................. 705/3 |

* cited by examiner

*Primary Examiner* — MD S Elahee (57) ABSTRACT

An integrated network communication device includes a data processing device, an image output device and a communication device. The data processing device is adapted to integrate various digital data and can be connected to an information network. The image output device is adapted to display image data on an image display screen. The communication device is adapted to exchange audio data with the information network, and further comprises an input unit, an audio output module, an audio input module, a traffic indication module and a bar-code identification module.

3 Claims, 7 Drawing Sheets

INTEGRATED NETWORK COMMUNICATION DEVICE

BACKGROUND OF THE INVENTION

1. Technical Field

The present invention relates to a network communication device, and more particularly, to a network communication device that integrates a data processing device, an image output device, a communication device and a bar-code identification module together.

2. Description of Related Art

With the constant development of computer and network technologies, almost all kinds of industries have now evolved into the digital era. Particularly in the medical industry, processing data of medical records through a digital network may deliver very high efficiency, and many medical instruments require use of computers to make diagnostic analysis. Therefore, computers and networks have become indispensable to the medical industry.

Figure 1A:
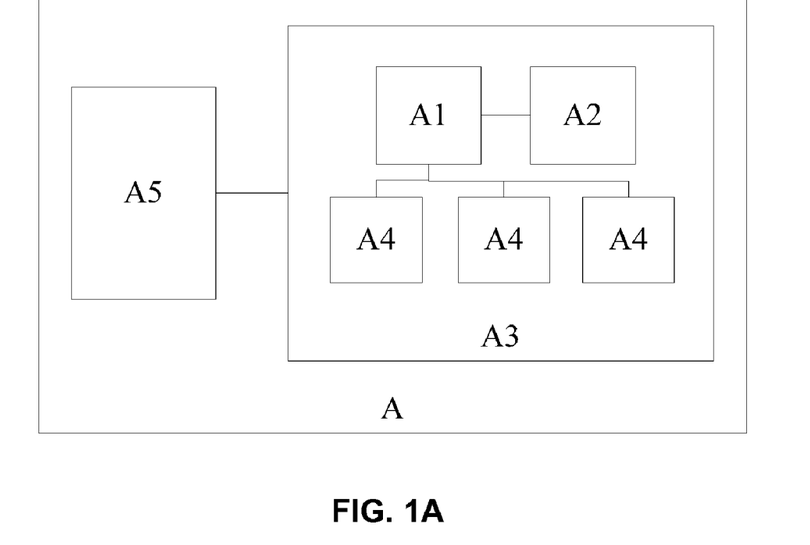
FIG. 1A is a block diagram of a conventional integrated computer framework.
Figure 1B:
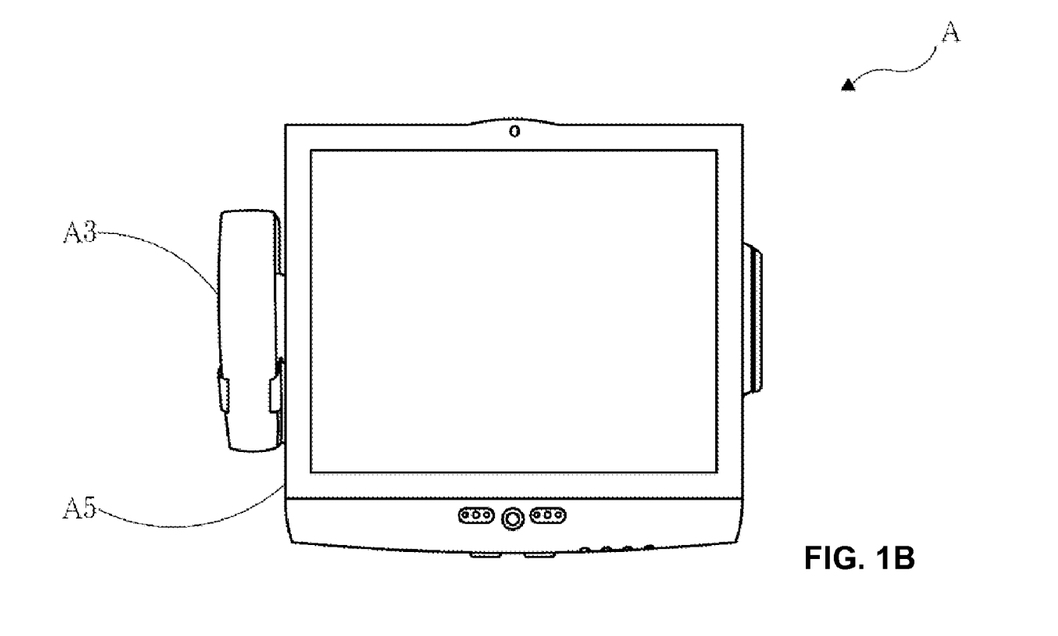
FIG. 1B is a front view of the conventional integrated computer framework.

Referring to FIG. 1A and FIG. 1B together, a block diagram of a conventional integrated computer framework and a front view of the conventional integrated computer framework are shown therein, respectively. For the purposes of small volume and easy operation, the conventional computer A for medical use has a mainboard A1 and a central processing unit (CPU) A2 integrated into a screen A3 and has a plurality of extended serial ports A4 disposed on the outside of the screen A3 so that all basic functions of a computer can be obtained on a single machine. Additionally, as telephone devices are typically necessary in daily operation of clinics, a telephone device A5 may also be integrated into the aforesaid computer.

As there is a limit on the volume of the aforesaid integrated computer, only basic computer components can be integrated therein and, accordingly, both functionality and extensibility of the integrated computer are limited. With the development of science and technology, more and more precision medical instruments have been developed and found wide application in medical diagnosis. However, these precision medical instruments must be used in conjunction with high-performance computers in order to make analysis. Moreover, as both the complexity and amount of data of medical records become increasingly large, the aforesaid conventional integrated computer has become inadequate for use. Therefore, it is necessary to provide an integrated computer with better functionality and extensibility so as to improve the operation efficiency and reduce the cost to use.

Additionally, although the conventional integrated computer has the telephone device integrated therein, the telephone device is connected in a wired way, which is inconvenient to use for medical personnel who have to change their positions frequently. Accordingly, it is necessary to provide an improved integrated computer which allows a telephone device to be used in a wireless way to increase the freedom in use.

BRIEF SUMMARY OF THE INVENTION

In view of the aforesaid problems and shortcomings, the present inventor, with great imaginative power and creative power, has made constant tests and modifications based on years of experience and finally provided an integrated network communication device of the present invention.

A first objective of the present invention is to provide an integrated network communication device with improved functionality and extensibility so as to make analysis on complex and massive data.

A second objective of the present invention is to provide an integrated network communication device in which a communication device incorporated therein is connected with a data processing device in a wireless way so as to increase the freedom in use.

The present invention discloses an integrated network communication device, which at least comprises:

a data processing device adapted to integrate various digital data, the data processing device further comprising: a network interface, through which the data processing device can be connected to an information network to receive and transmit data from and to the information network; and a first wireless transceiving interface adapted to transmit and receive specific wireless messages;

an image output device connected with the data processing device, the image output device being adapted to receive image data transmitted by the data processing device and display the image data on an image display screen; and a communication device connected with the data processing device in a wireless way, being adapted to receive and transmit audio data from and to the information network and further comprising: a second wireless transceiving interface, being adapted to form a wireless signal link with the first wireless transceiving interface for exchange of digital data; an input unit, being adapted for a user to input an operational instruction and dial a specific telephone number; an audio output module, being adapted to output the audio data transmitted by the information network; an audio input module, being adapted to input audio data and transmit the audio data to the information network; a traffic indication module, being adapted to display a usage status of the communication device; and a bar-code identification module, being adapted to identify data of a bar code and transmit the data to the data processing device.

BRIEF DESCRIPTION OF THE SEVERAL VIEWS OF THE DRAWINGS

The invention as well as a preferable mode of use and advantages thereof will be best understood by referring to the following detailed description of an illustrative embodiment in conjunction with the accompanying drawings, wherein.

DETAILED DESCRIPTION OF THE INVENTION

To achieve the aforesaid objectives and efficacy, the present inventor has made improvement on an integrated computer including incorporating a multifunctional network telephone device therein and, through constant modifications and adjustments, finally obtained an integrated network communication device of the present invention. Hereinafter, the system framework and advantages of the present invention will be described in detail with reference to a first preferred embodiment, a second preferred embodiment, a third preferred embodiment and a fourth preferred embodiment of the integrated network communication device of the present invention respectively.

Figure 2:
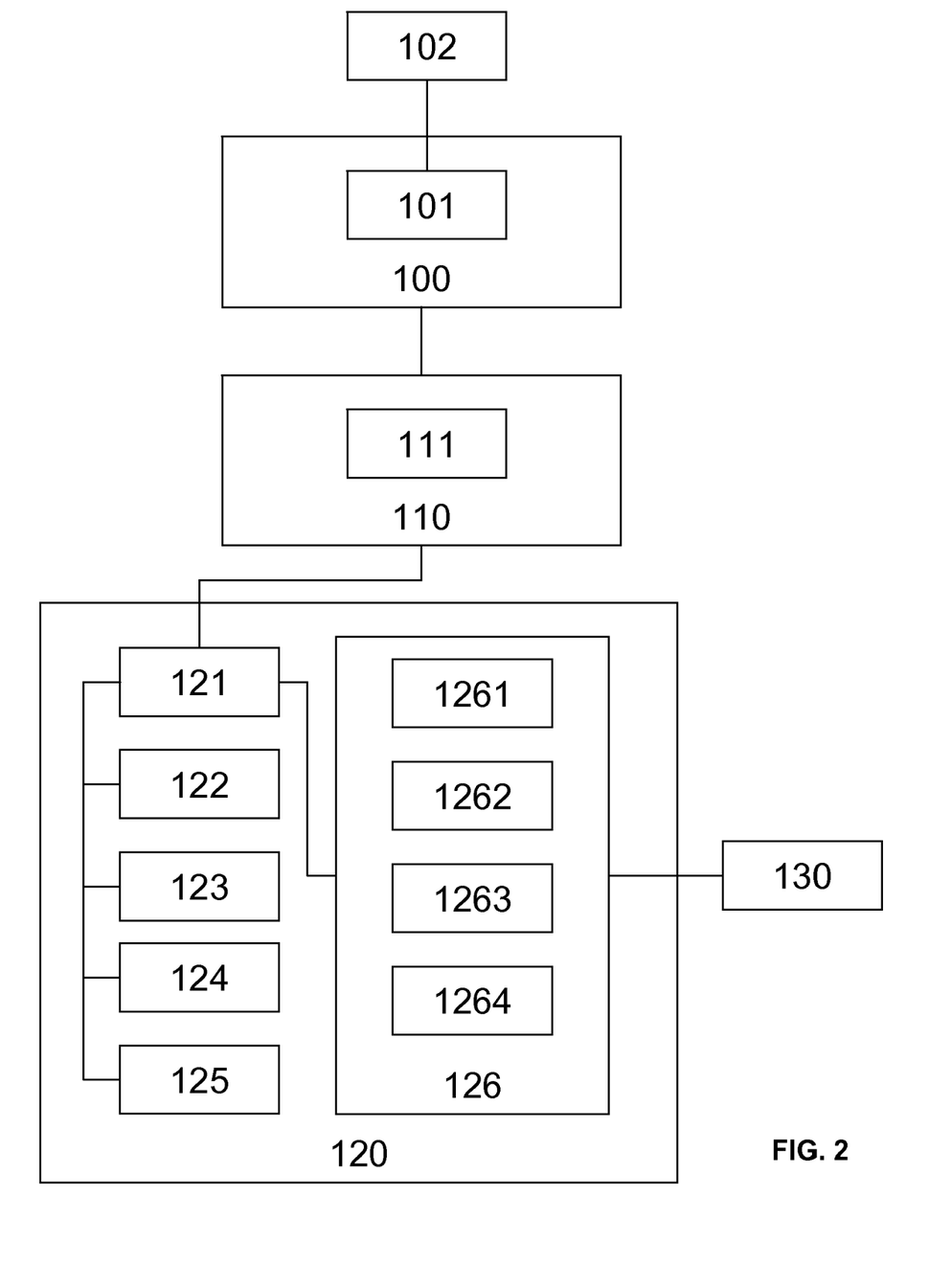
FIG. 2 is a block diagram illustrating a system framework of an integrated network communication device according to a first preferred embodiment of the present invention.

Firstly, referring to FIG. 2, there is shown a block diagram illustrating a system framework of an integrated network communication device according to the first preferred embodiment of the present invention. The integrated network communication device comprises a data processing device 100, an image output device 110 and a communication device 120.

The data processing device 100 is adapted to integrate various digital data, and can be connected to an information network 102 via a network interface 101 to receive and transmit data from and to the information network 102.

The image output device 110 is connected with the data processing device 100, and is adapted to receive image data transmitted by the data processing device 100 and display the image data on an image display screen 111. The image display screen 111 is a liquid-crystal display (LCD) and, further, is a touch panel adapted for a user to touch directly to operate the data processing device 100.

The communication device 120 is connected with the image output device 110 via a universal serial bus (USB) interface 121, and is adapted to receive and transmit audio data from and to the information network 102 via the image output device 110 and the data processing device 100. The communication device 120 further comprises: an input unit 122 adapted for a user to input an operational instruction and dial a specific telephone number; an audio output module 123 adapted to output audio data transmitted by the information network 102; an audio input module 124 adapted to input audio data and transmit the audio data to the information network 102; a status indication module 125 adapted to display a usage status of the communication device 120; and a bar-code identification module 126 adapted to identify data of a bar code 130 and transmit the data to the data processing device 100.

The aforesaid bar-code identification module 126 further comprises: a switch 1261 adapted for a user to control to turn on the bar-code identification module 126; a light source unit 1262 adapted to project a light beam onto the bar code 130 when the switch 1261 is switched on; a photoelectric conversion unit 1263 adapted to receive an optical signal reflected from the bar code 130 and convert the optical signal into an electrical signal; and a decoding unit 1264 adapted to receive the electrical signal and decode the electrical signal into the data.

In the integrated network communication device of the first preferred embodiment of the present invention, audio formats that can be supported include PCM, ADPCM, SB-ADPCM, ACELP, CS-ACELP, eX-CELP, RPE-LTP, EVRC, MPEG, AC3, DTS, WMA and AAC, and video formats that can be supported include H.261, H.263, H.264, MPEG1, MPEG2 and MPEG4.

Figure 3:
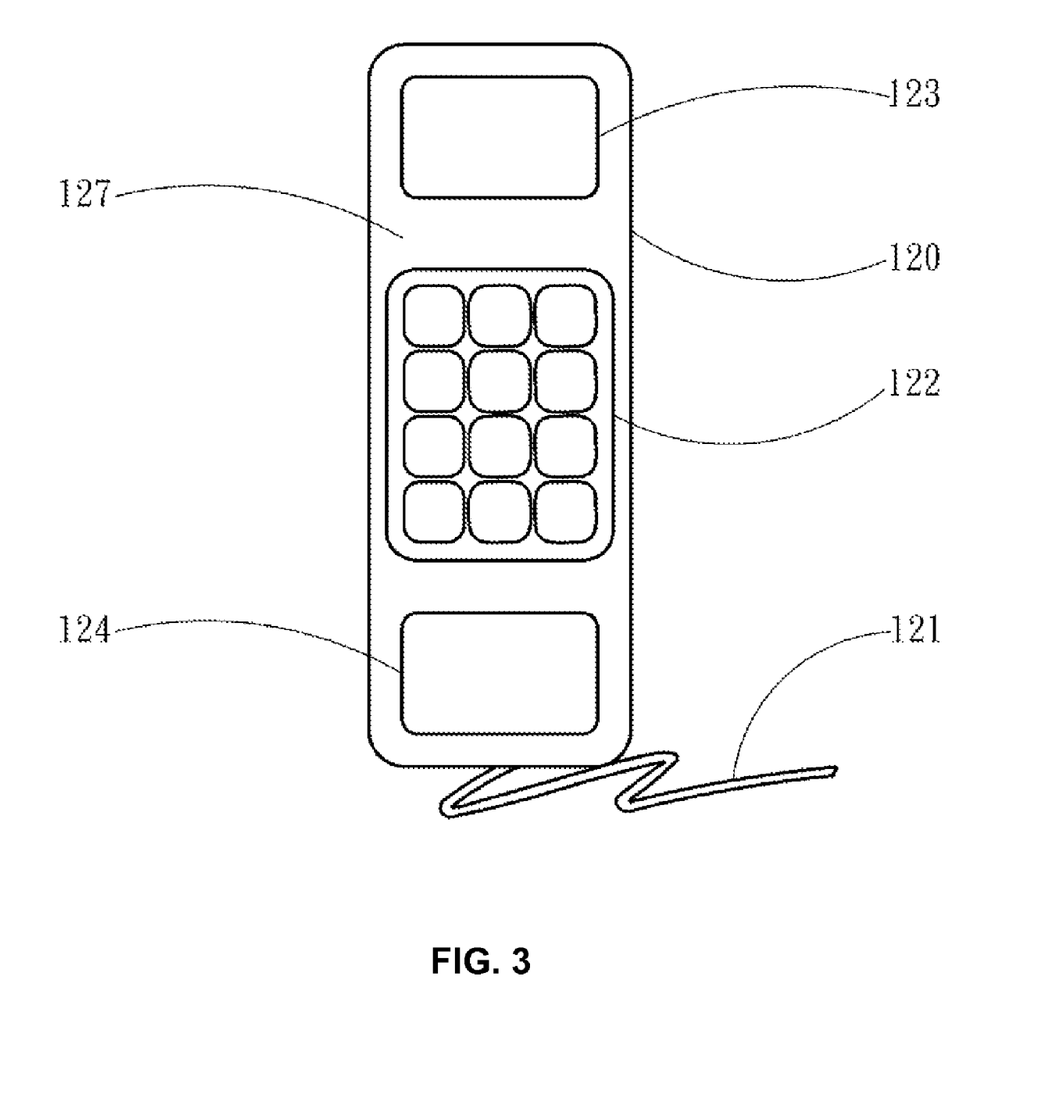
FIG. 3 is a schematic outline view of a first surface of the communication device according to the first preferred embodiment of the present invention.

Referring next to FIG. 3, there is shown a schematic outline view of a first surface 127 of the communication device 120 according to the first preferred embodiment of the present invention. As shown in FIG. 3, the audio output module 123 and the audio input module 124 of the communication device 120 are disposed at two ends of the communication device 120 respectively in order to be ergonomic in use; the input unit 122 is disposed between the audio output module 123 and the audio input module 124 and is adapted for a user to input a telephone number and perform instruction manipulations; and the USB interface 121 is disposed at an end of the communication device 120 for connection with the image output device 110.

Figure 4:
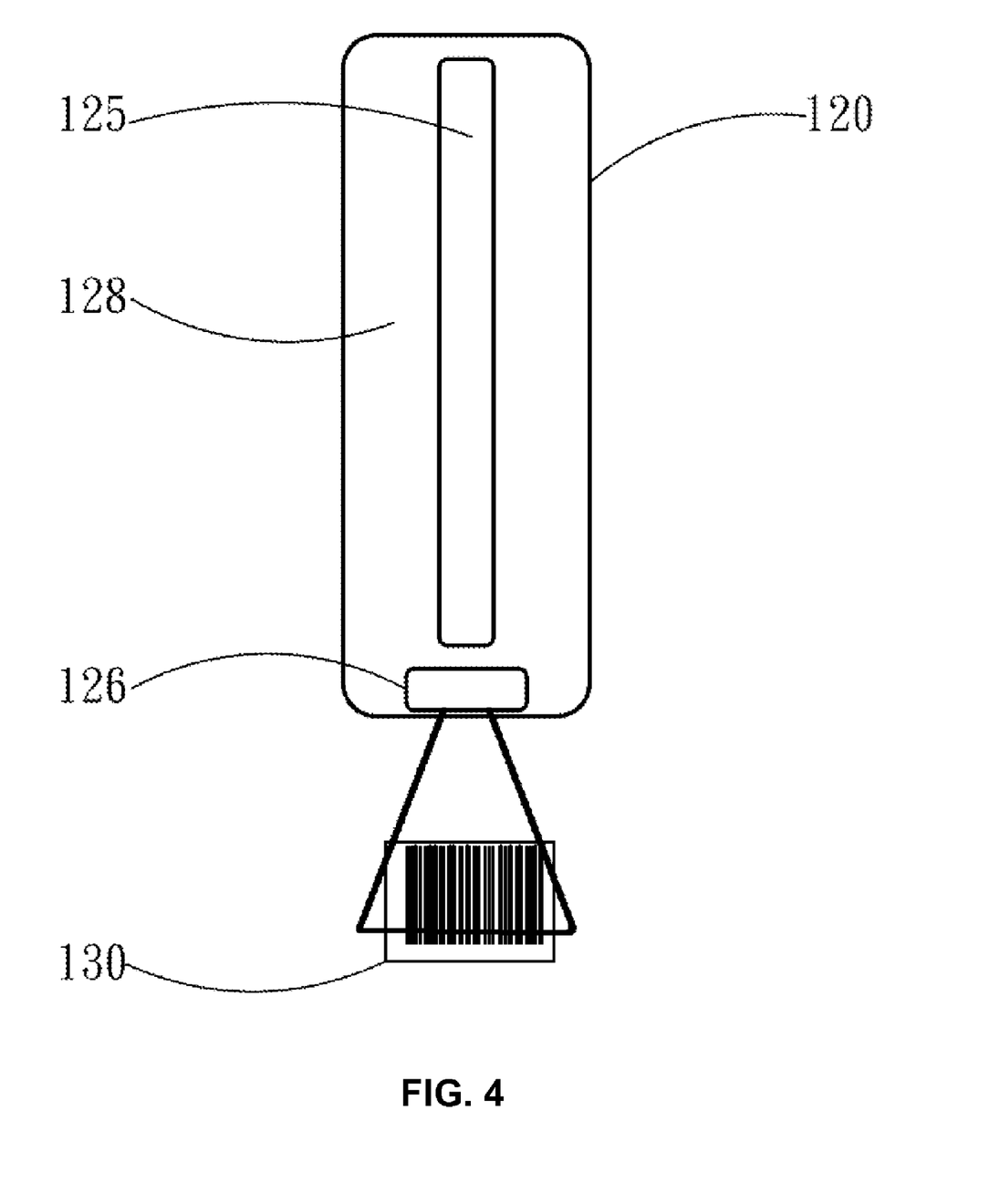
FIG. 4 is a schematic outline view of a second surface of the communication device according to the first preferred embodiment of the present invention.

Referring next to FIG. 4, there is shown a schematic outline view of a second surface 128 of the communication device 120 according to the first preferred embodiment of the present invention. As shown in FIG. 4, on the second surface 128 of the communication device 120 is disposed a status indication module 125, which sends out messages in form of color variations, flickers or text prompts to remind the user of the current usage status of the communication device 120 when there is an incoming or outgoing call; the bar-code identification module 126 is also disposed on the second surface 128, and is adapted to scan and identify a bar code 130 to convert it into a medical record number, a telephone number or other digital information, so as to improve the operation efficiency.

Figure 5:
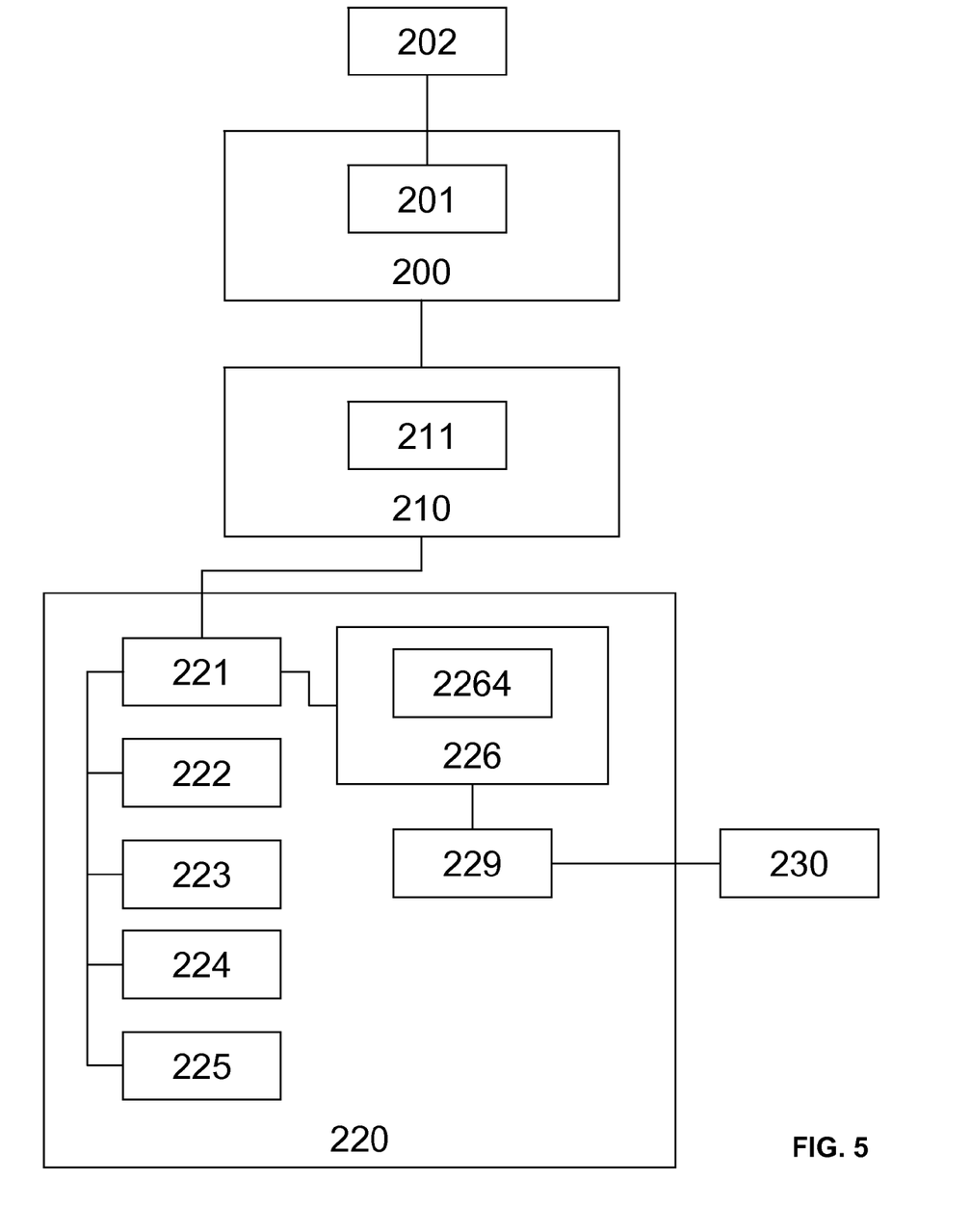
FIG. 5 is a block diagram illustrating a system framework of an integrated network communication device according to a second preferred embodiment of the present invention.

Referring next to FIG. 5, there is shown a block diagram illustrating a system framework of an integrated network communication device according to the second preferred embodiment of the present invention. Most of the structures and components of the second embodiment are the same as those of the first preferred embodiment, except that the communication device 220 further comprises an image capturing module 229 adapted to capture an image of the bar code 230 and transmit the image to the bar-code identification module 226. The bar-code identification module 226 further comprises a decoding unit 2264 adapted to decode the image of the bar code 230 into the data.

Figure 6:
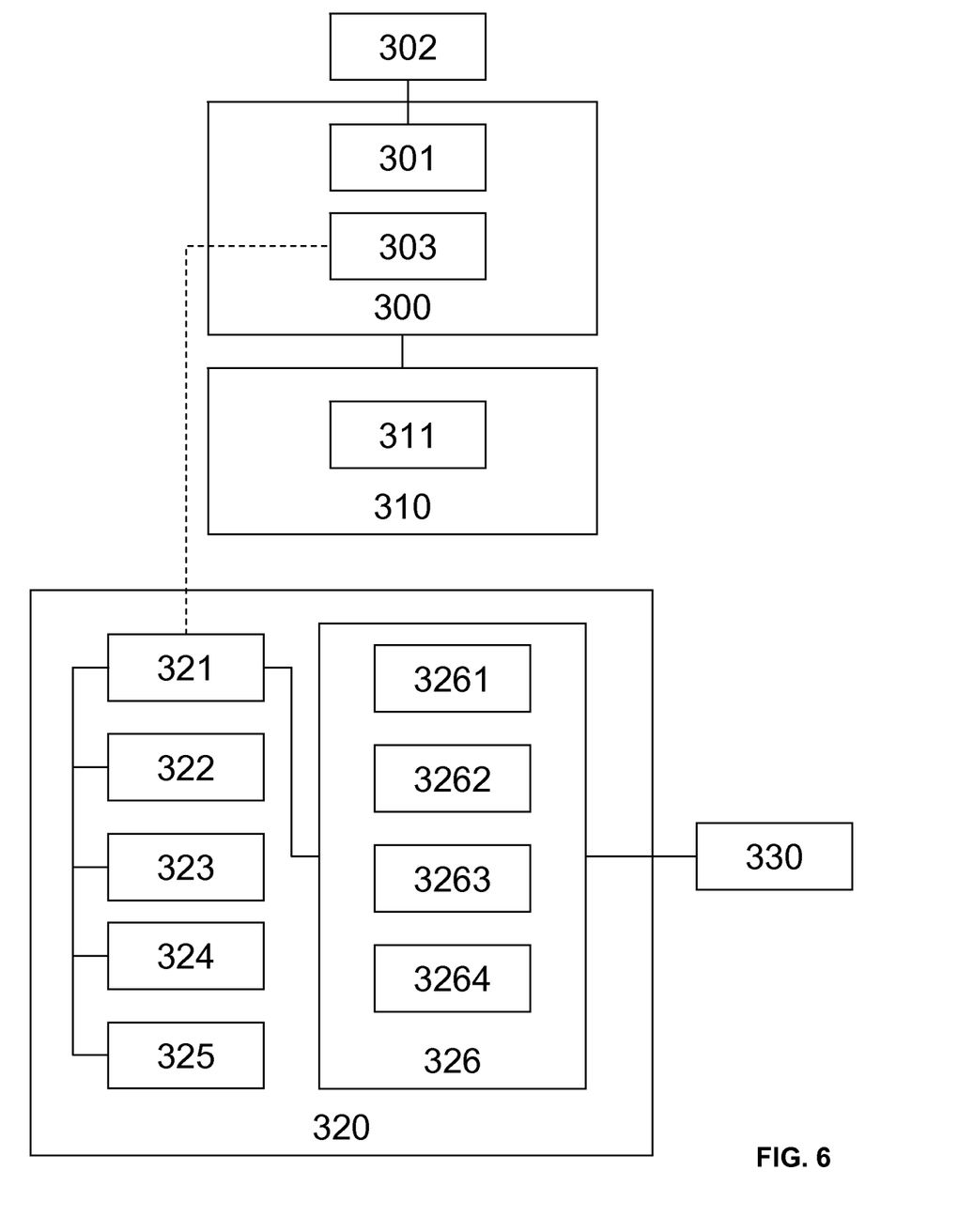
FIG. 6 is a block diagram illustrating a system framework of an integrated network communication device according to a third preferred embodiment of the present invention.

Referring next to FIG. 6, there is shown a block diagram illustrating a system framework of an integrated network communication device according to the third preferred embodiment of the present invention. The integrated network communication device comprises a data processing device 300, an image output device 310, and a communication device 320.

The data processing device 300 is adapted to integrate various digital data, and further comprises: a network interface 301, through which the data processing device 300 can be connected to an information network 302 to receive and transmit data from and to the information network 302; and a first wireless transceiving interface 303 adapted to transmit and receive specific wireless messages.

The image output device 310 is connected with the data processing device 300, and is adapted to receive image data transmitted by the data processing device 300 and display the image data on an image display screen 311. The image display screen 311 is a liquid-crystal display (LCD) and, further, is a touch panel adapted for a user to touch directly to operate the data processing device 300.

The communication device 320 is connected with the data processing device 300 in a wireless way, and is adapted to receive and transmit audio data from and to the information network 302. The communication device 320 further comprises: a second wireless transceiving interface 321 adapted to form a wireless signal link with the first wireless transceiving interface 303 for exchange of digital data, wherein the wireless signal may be an infrared ray (IR) signal, a laser signal, a Bluetooth signal, a WiMAX signal, a radio frequency identification (RFID) signal or a Zigbee signal; an input unit 322 adapted for a user to input an operational instruction and dial a specific telephone number; an audio output module 323 adapted to output audio data transmitted by the information network 302; an audio input module 324 adapted to input audio data and transmit the audio data to the information network 302; a status indication module 325 adapted to display a usage status of the communication device 320; and a bar-code identification module 326 adapted to identify data of a bar code 330 and transmit the data to the data processing device 300.

The aforesaid bar-code identification module 326 further comprises: a switch 3261 adapted for the user to control to turn on the bar-code identification module 326; a light source unit 3262 adapted to project a light beam onto the bar code 330 when the switch 3261 is switched on; a photoelectric conversion unit 3263 adapted to receive an optical signal reflected from the bar code 330 and convert the optical signal into an electrical signal; and a decoding unit 3264 adapted to receive the electrical signal and decode the electrical signal into the data.

In the integrated network communication device of the third preferred embodiment of the present invention, audio formats that can be supported include PCM, ADPCM, SB-ADPCM, ACELP, CS-ACELP, eX-CELP, RPE-LTP, EVRC, MPEG, AC3, DTS, WMA and AAC, and video formats that can be supported include H.261, H.263, H.264, MPEG1, MPEG2 and MPEG4.

Figure 7:
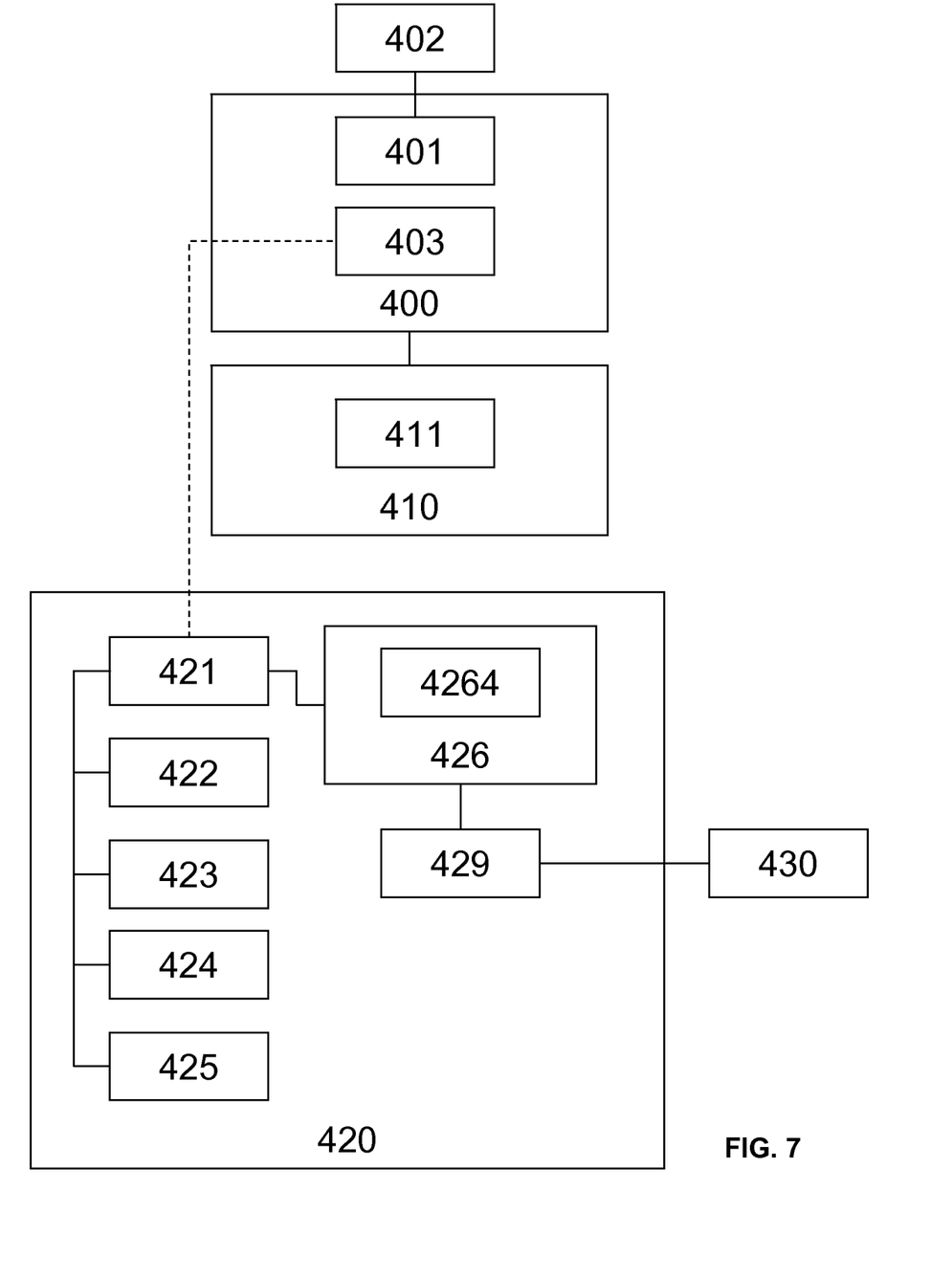
FIG. 7 is a block diagram illustrating a system framework of an integrated network communication device according to a fourth preferred embodiment of the present invention.

Referring next to FIG. 7, there is shown a block diagram illustrating a system framework of an integrated network communication device according to the fourth preferred embodiment of the present invention. Most of the structures and components of the fourth embodiment are the same as those of the third preferred embodiment, except that the communication device 420 further comprises an image capturing module 429 adapted to capture an image of the bar code 430 and transmit the image to the bar-code identification module 426. The bar-code identification module 426 further comprises a decoding unit 4264 adapted to decode the image of the bar code 430 into the data.

For the communication devices described in the aforesaid first to fourth preferred embodiments, network calls conducted are based on Skype which, in turn, is based on the VoIP technology. According to the VoIP technology, a VoIP gateway is used to digitally sample a voice from a voice originating end and convert the sampled voice into a digital signal, which is then compressed and converted into a network packet format; after the digital signal in the network packet format is transmitted through the network to a VoIP gateway of a voice terminating end, the voice will be restored in a reverse process. Therefore, the network transmission mode of the voice packet is essentially identical to that of general data packets. However, because voice transmission is in a real-time nature and does not allow for alterations in the receiving sequence, no delay or altered arrival sequence due to different routing shall occur. For this reason, the VoIP technology can control transmission of voice packets by reserving a bandwidth and using a priority mechanism so as to ensure that no delay or interruption will occur due to network traffic jam; when there is no voice transmission, the network bandwidth can be released so that a larger bandwidth is available for use by the general data packets.

From the above detailed description of the system framework of the present invention, advantages of the present invention can be summarized as follows:

1. The integrated network communication device disclosed in the present invention provides improved functionality and extensibility, which represents great improvement in respect of both processing of massive information and component extensibility.
2. As the wireless communication technology is introduced into the present invention, considerable freedom can be obtained in use without being limited by the space where the device is used.

The embodiments described above are only provided to illustrate technical concepts and features of the present invention so that those skilled in the art can appreciate the disclosures of the present invention and practice the present invention accordingly, but not to limit the scope of the present invention. Accordingly, all equivalent modifications or alterations made in accordance with spirits of the present invention shall still fall within the scope of the claims of the present invention.

What is claimed is:

1. An integrated network communication device, at least comprising:
    a data processing device, being adapted to integrate various digital data, the data processing device being connected to an information network via a network interface to receive and transmit data from and to the information network;
    an image output device, being connected with the data processing device, the image output device being adapted to receive an image data transmitted by the data processing device, so as to display the image data on an image display screen thereof, wherein the image display screen is a touch panel adapted for a user to touch directly to operate the data processing device 100; and
    a communication device, being connected with the image output device by a universal serial bus (USB) interface thereof, wherein the communication device adapted to receive a first audio data transmitted by information network via the image output device and the data processing device; and transmit a second audio data to the information network, the communication device further comprising:
        an input unit, being adapted for the user to input an operational instruction and dial a specific telephone number;
        an audio output module, being adapted to output the first audio data transmitted by the information network;
        an audio input module, being adapted to input the second audio data and transmit the second audio data to the information network;
        a status indication module, being adapted to display a usage status of the communication device; and
        a bar-code identification module, being adapted to identify a bar code and transmit a bar code data to the data processing device, wherein the bar-code identification module comprises:
            a switch, being adapted for the user to control to turn on the bar-code identification module;
            a light source unit, being adapted to project a light beam onto the bar code when the switch is switched on;
            a photoelectric conversion unit, being adapted to receive an optical signal reflected from the bar code and convert the optical signal into an electrical signal; and a decoding unit, being adapted to receive the electrical signal and decode the electrical signal into the data.

2. The integrated network communication device of claim 1, wherein the integrated network communication device at least supports one audio format selected from the group consisting of PCM, ADPCM, SB-ADPCM, ACELP, CS-ACELP, eX-CELP, RPE-LTP, EVRC, MPEG, AC3, DTS, WMA and AAC.

3. The integrated network communication device of claim 1, wherein the integrated network communication device at least supports one video format selected from the group consisting of H.261, H.263, H.264, MPEG1, MPEG2 and MPEG4.

* * * * *